(12) United States Patent  
Miller et al.

(10) Patent No.: US 7,864,517 B2
(45) Date of Patent: Jan. 4, 2011

(54) MOBILE COMPUTER DEVICE BINDING FEEDBACK

(75) Inventors: Michael C. Miller, Sammamish, WA (US); Gregory H. Parks, Redmond, WA (US); Andrew J. Fuller, Redmond, WA (US); Steven P. Dodge, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 60 days.

(21) Appl. No.: 12/413,827

(22) Filed: Mar. 30, 2009

(65) Prior Publication Data

US 2010/0245106 A1 Sep. 30, 2010

(51) Int. Cl.
 *G06F 1/16* (2006.01)
(52) U.S. Cl. .................................. 361/679.27; 345/1.1
(58) Field of Classification Search ............ 361/679.27; 345/1.1; 710/7, 14, 15, 16, 18
 See application file for complete search history.

(56) References Cited

U.S. PATENT DOCUMENTS

| | | | | |
|---|---|---|---|---|
| 5,847,698 | A * | 12/1998 | Reavey et al. ............ | 345/173 |
| 6,295,038 | B1 * | 9/2001 | Rebeske .................. | 345/1.1 |
| 6,421,235 | B2 | 7/2002 | Ditzik | |
| 6,512,497 | B1 * | 1/2003 | Kondo et al. ............. | 345/1.1 |
| 6,798,649 | B1 | 9/2004 | Olodort et al. | |
| 6,822,635 | B2 | 11/2004 | Shahoian et al. | |
| 6,842,338 | B2 | 1/2005 | Iredale | |
| 6,961,239 | B2 | 11/2005 | Schedivy | |
| 7,221,330 | B2 * | 5/2007 | Finke-Anlauff ........... | 345/1.1 |
| 7,433,179 | B2 * | 10/2008 | Hisano et al. .......... | 361/679.27 |
| 7,457,108 | B2 | 11/2008 | Ghosh | |
| 7,489,286 | B2 * | 2/2009 | Kawase et al. ............ | 345/1.1 |
| 7,489,503 | B2 * | 2/2009 | Maatta .................. | 361/679.27 |
| 7,515,406 | B2 * | 4/2009 | Kee et al. ............... | 361/679.21 |
| 7,542,273 | B2 * | 6/2009 | Laycock et al. ......... | 361/679.27 |
| 7,570,483 | B2 * | 8/2009 | Kim ..................... | 361/679.26 |
| 2005/0052835 | A1 * | 3/2005 | Wu et al. ................ | 361/681 |
| 2005/0248501 | A1 * | 11/2005 | Kim ..................... | 345/1.1 |
| 2005/0264536 | A1 | 12/2005 | Kyrola et al. | |
| 2006/0089182 | A1 | 4/2006 | Gartrel | |
| 2006/0146488 | A1 * | 7/2006 | Kimmel .................. | 361/681 |
| 2006/0183505 | A1 * | 8/2006 | Willrich ................. | 455/566 |
| 2006/0187142 | A1 * | 8/2006 | Lesniak .................. | 345/1.1 |
| 2006/0249717 | A1 | 11/2006 | Conti | |
| 2007/0182663 | A1 * | 8/2007 | Biech ................... | 345/1.1 |
| 2007/0242421 | A1 * | 10/2007 | Goschin et al. .......... | 361/681 |
| 2008/0024388 | A1 * | 1/2008 | Bruce ................... | 345/1.1 |

(Continued)

OTHER PUBLICATIONS

"Samsung G400 Soul—Samsung Mobile Phone Club", retrieved at <<http://www.samsungmobilephoneclub.com/Samsung-G400-Soul.html>>, Jan. 30, 2009, pp. 1-4.

*Primary Examiner*—Lisa Lea-Edmonds (57) ABSTRACT

Embodiments of mobile computer device binding feedback are described. In embodiments, an application interface for a device application is displayed on a first display that is integrated in a first housing of a dual-display mobile computer device. The application interface can also be displayed on a second display that is integrated in a second housing of the dual-display mobile computer device. Binding position data is received that is associated with a binding system that movably connects the first housing and the second housing. Application context data that is associated with the device application is also received. Feedback can then be generated that correlates to the binding position data and to the application context data.

20 Claims, 5 Drawing Sheets

U.S. PATENT DOCUMENTS

2008/0062625 A1* 3/2008 Batio .................... 361/680
2008/0158795 A1* 7/2008 Aoki et al. .............. 361/681
2009/0190295 A1* 7/2009 Chin et al. ............. 361/679.27
2010/0157518 A1* 6/2010 Ladouceur et al. ..... 361/679.09

* cited by examiner

MOBILE COMPUTER DEVICE BINDING FEEDBACK

BACKGROUND

Portable computer devices are increasingly more common and mobile, such as laptop computers, tablet PCs, ultra-mobile PCs, as well as other mobile data, messaging, and/or communication devices. One type of mobile computer device is hinged and opens to display two touch-screen displays, one integrated in each half of a device housing. To interact with an application or user interface on one or both of the touch-screen displays, a user releases hold on one half of the device housing for a free hand to interact with selectable controls either on the user interface or in the device housing. This may cause the user to have to adopt an uncomfortable or less than optimal support and grip position on the device to allow for touch-screen interaction with the free hand. To prevent the free half of the device housing from pivoting and/or hanging freely when released by a user, the hinge between each half of the device housing typically has physical and/or static detents to hold the touch-screen displays of the device in a particular display position.

SUMMARY

This summary is provided to introduce simplified concepts of mobile computer device binding feedback. The simplified concepts are further described below in the Detailed Description. This summary is not intended to identify essential features of the claimed subject matter, nor is it intended for use in determining the scope of the claimed subject matter.

Embodiments of mobile computer device binding feedback are described. In embodiments, an application interface for a device application is displayed on a first display that is integrated in a first housing of a dual-display mobile computer device. The application interface can also be displayed on a second display that is integrated in a second housing of the dual-display mobile computer device. Binding position data is received that is associated with a binding system that movably connects the first housing and the second housing. Application context data that is associated with the device application is also received. Feedback can then be generated that correlates to the binding position data and to the application context data.

In other embodiments, the feedback can be generated as audio feedback, video feedback, display feedback, and/or various forms of haptic feedback. Device setting data can also be received and the feedback can be generated to correlate to the device setting data. The feedback can include locking the binding system to hold the first housing and the second housing in a secure posture. Alternatively, the feedback can include stiffening the binding system to hold the first housing and the second housing in a display posture. Alternatively, the feedback can include changing rates and intensity of vibration when approaching a device display posture. Alternatively, the feedback can include simulating detents of the binding system to indicate a display posture in which to position the first display and the second display. The display posture can correlate to the position of the first display and the second display to display the application interface according to the application context data.

In other embodiments, the feedback can indicate a laptop display posture when the application context data correlates to a landscape display mode of the application interface, and when the binding position data correlates to an angle between the first display and the second display that is less than one-hundred and eighty degrees (180°). Alternatively, the feedback can indicate a book display posture when the application context data correlates to a portrait display mode of the application interface, and when the binding position data correlates to an angle between the first display and the second display that is less than one-hundred and eighty degrees (180°). Alternatively, the feedback can indicate a presentation display posture when the application interface is displayed in approximate opposing directions on the first display and on the second display, and when the binding position data correlates to an angle between the first display and the second display that is greater than one-hundred and eighty degrees (180°) and less than three-hundred and sixty degrees (360°). Alternatively, the feedback can indicate a surface display posture when the binding position data correlates to an angle between the first display and the second display that is approximately one-hundred and eighty degrees (180°), or the feedback can indicate a tablet display posture when the binding position data correlates to an angle between the first display and the second display that is approximately three-hundred and sixty degrees (360°).

BRIEF DESCRIPTION OF THE DRAWINGS

Embodiments of mobile computer device binding feedback are described with reference to the following drawings. The same numbers are used throughout the drawings to reference like features and components.

DETAILED DESCRIPTION

Embodiments of mobile computer device binding feedback provide that binding position data can received from a binding system that movably connects a first housing and a second housing of a dual-display mobile computer device. The binding position data can include a position angle between the first housing and the second housing. Application context data that is associated with a device application can also be received, and feedback can be generated that correlates to the binding position data and to the application context data. The feedback can include locking the binding system to hold the first housing and the second housing in a secure posture. Alternatively, the feedback can include stiffening the binding system to hold the first housing and the second housing in a display posture. Alternatively, the feedback can include changing rates and intensity of vibration when approaching a device display posture. Alternatively, the feedback can include simulating detents of the binding system to indicate a display posture in which to position a first display and a second display. The display posture can correlate to the position of the first and second displays to display the application interface according to the application context data. The feedback can also be initiated as a haptic experience, such as physical resistance to motion or changes in rate or intensity of vibration, that correlates to the binding position data, the application context data, and/or to device setting data, where the haptic experience is generally indicative of any physical user feedback.

While features and concepts of the described systems and methods for mobile computer device binding feedback can be implemented in any number of different environments, systems, and/or various configurations, embodiments of mobile computer device binding feedback are described in the context of the following example systems and environments.

Figure 1:
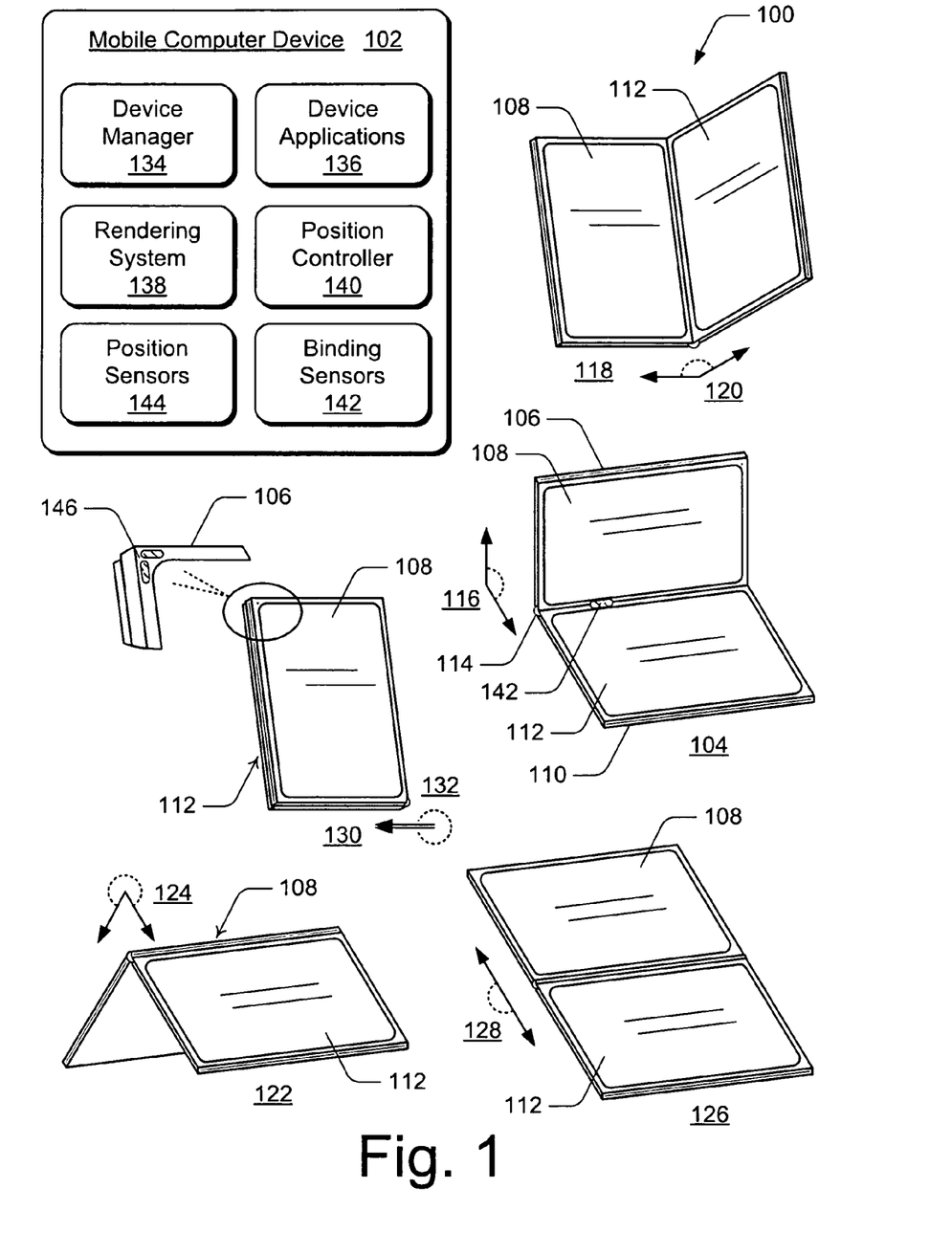
FIG. 1 illustrates an example mobile computer device in which embodiments of mobile computer device binding feedback can be implemented.

FIG. 1 illustrates several display postures 100 of an example mobile computer device 102 in which various embodiments of mobile computer device binding feedback can be implemented. The mobile computer device 102 can be implemented as any one or combination of a mobile computing and/or communication device, such as a mobile netbook, mobile personal computer, personal digital assistant (PDA), mobile phone (e.g., cellular, VoIP, WiFi, etc.) that is implemented for data, messaging, and/or voice communications, a media device (e.g., a personal media player, portable media player, etc.), gaming device, appliance device, electronic device, consumer device, and/or any other type of mobile computer device that can receive, display, and/or communicate data in any form of audio, video, and/or image data.

A mobile computer device can be implemented with one or more sensors, processors, communication components, data inputs, memory components, processing and control circuits, integrated display devices, and/or a content rendering system. A mobile computer device can also be implemented with any number and combination of differing components as described with reference to the example device shown in FIG. 5. In this example, mobile computer device 102 is implemented as a dual-display mobile computer device that includes at least two integrated display devices, such as LCDs or other similar display systems.

The several display postures 100 of the mobile computer device 102 represent some of the various display configurations for the dual-displays of the mobile computer device, such as illustrated in a laptop display posture 104. The mobile computer device 102 has a first housing 106 that includes an integrated first display 108, and the mobile computer device has a second housing 110 that includes an integrated second display 112. The mobile computer device 102 includes a binding system 114, such as any type of hinge or rotatable mechanism, which movably connects the first housing 106 to the second housing 110. In an embodiment, the binding system 114 can be implemented as a multi-axis hinge that movably connects the first housing to rotate in at least two different directions relative to the second housing. Alternatively or in addition, the binding system 114 can include an internal drive mechanism to position the first housing 106 and/or the second housing 110 in any of the various display postures 100. The internal drive mechanism of the binding system 114 can be initiated by the mobile computer device 102 itself based on sensor data and/or when a user-selectable control is initiated.

In the laptop display posture 104, the first display 108 and the second display 112 are positioned to display in a landscape mode, and a position angle 116 between the first display and the second display is less than one-hundred and eighty degrees (180°). This display configuration resembles how a laptop computer is commonly used, and in an implementation, the second display 112 can be utilized to display a touch-screen keyboard and the first display 108 can display an application or other type of user interface.

In a book display posture 118, the first display 108 and the second display 112 are positioned to display in a portrait mode, and a position angle 120 between the first display and the second display is less than one-hundred and eighty degrees (180°). This display configuration resembles a book opened for reading, and in an implementation, the first and second displays can each display a page of an electronic book.

In a presentation display posture 122, the first display 108 and the second display 112 are positioned to display in approximate opposing directions, and a position angle 124 between the first and second displays is greater than one-hundred and eighty degrees (180°) and less than three-hundred and sixty degrees (360°). This display configuration can be used to display pictures, such as when the device is placed on a desk, and/or provides a divider between users that are sitting across from each other. The first display 108 and the second display 112 can be positioned to display in a landscape mode as illustrated in this example. Alternatively, the first display 108 and the second display 112 can be positioned to display in a portrait mode.

In a surface display posture 126, a position angle 128 between the first display 108 and the second display 112 is approximately one-hundred and eighty degrees (180°). In this display configuration, the mobile computer device 102 can be utilized in a landscape or portrait mode, as a smart table, a collaborative surface or whiteboard, for an electronic book, or a map, and the like. In a tablet display posture 130, a position angle 132 between the first display 108 and the second display 112 is approximately three-hundred and sixty degrees (360°). This display configuration resembles how a tablet computer is commonly used, and can be positioned for display in a landscape or portrait mode. Alternatively, this display posture can also include a display screen posture when the mobile computer device 102 is positioned for vertical viewing (landscape or portrait mode) like a common computer screen.

In an alternate configuration of the tablet display posture 130, and when the binding system 114 of the mobile computer device 102 is implemented as a multi-axis hinge that movably connects the first housing 106 to rotate in at least two different directions relative to the second housing 110, the first display 108 can also be rotated approximately one-hundred and eighty degrees (180°) relative to the second display 112 on a second axis. In this alternate configuration, the back of the first housing of the device is folded onto the bottom display (e.g., the second display 112) and the bottom display is protected by the back of the first housing that includes the top display (e.g., the first display 108).

In this example, mobile computer device 102 includes a device manager 134 that can include any one or combination of a control application, software application, signal processing and control module, code that is native to the particular device, and/or a hardware abstraction layer for the particular device. The mobile computer device 102 includes various software and device applications 136, such as a music and/or video player, a Web browser, an email application, and the like. The mobile computer device 102 also includes a rendering system 138 to render content for display, such as application interfaces for the various device applications 136. The mobile computer device 102 also includes a position controller 140 that can be implemented as computer-executable instructions and executed by processors to implement various embodiments and/or features of mobile computer device binding feedback. In an embodiment, the position controller 140 can be implemented as a component or module of the device manager 134 and/or can be implemented as one of the device applications 136.

In embodiments, the mobile computer device 102 also includes various sensors, such as one or more binding sensors 142 and/or one or more position sensors 144. A binding sensor 142 can generate position data that indicates a position angle between the first display 108 and the second display 112. Alternatively or in addition, a first housing position sensor 144 (or multiple position sensors) can be implemented to generate the position data that indicates an orientation of the first housing 106. Similarly, a second housing position sensor 144 (or multiple position sensors) can be implemented to generate the position data that indicates an orientation of the second housing 110. In embodiments, the position sensors 144 can be implemented as accelerometers 146 that are integrated into the housing 106 (i.e., and housing 110) of the mobile computer device 102.

In various embodiments, the position controller 140 is implemented to receive the position data, such as from the binding sensors 142 and/or the position sensors 144, and determine a position angle between the first display 108 and the second display 112 that correlates to a display posture of the mobile computer device 102. The position controller 140 can determine a display posture of the mobile computer device 102 from the position angle between the first display 108 and the second display 112. Alternatively and/or in addition, the position controller 140 can determine the display posture of the mobile computer device 102 from an orientation of the first housing 106 and/or from an orientation and the second housing 110. The position controller 140 can also initiate a presentation mode of an application interface on the first display 108 and on the second display 112 according to the determined display posture of the mobile computer device 102.

In other embodiments, the position controller 140 can monitor how a user opens and uses the mobile computer device 102. The position controller 140 is implemented to receive position data from the binding sensors 142 and/or the position sensors 144, such as the accelerometers 146 that are integrated in each of the first housing 106 and second housing 110 of the mobile computer device 102. The position controller 140 can then determine intended gestures that correlate to intuitive actions from the position data, such as gestures that change the angle between the first display 108 and the second display 112, and how one display is positioned relative to the other.

The intuitive actions can correlate to gestures or device movements that are intended to turn a book page when the mobile computer device 102 is positioned in the book display posture 118. A gesture or device movement can also be determined to page forward or back in a book reader, or advance to a next or previous Web page in an Internet browser application. In an embodiment, the content being displayed on the first and second displays of the mobile computer device 102 can be changed based on movements of the device. For example, a display of the mobile computer device 102 can display a work document for viewing while a user walks from a meeting back to his or her office, and then display pictures or a calendar when the device is placed down on the user's desk in the presentation display posture 122.

Figure 2:
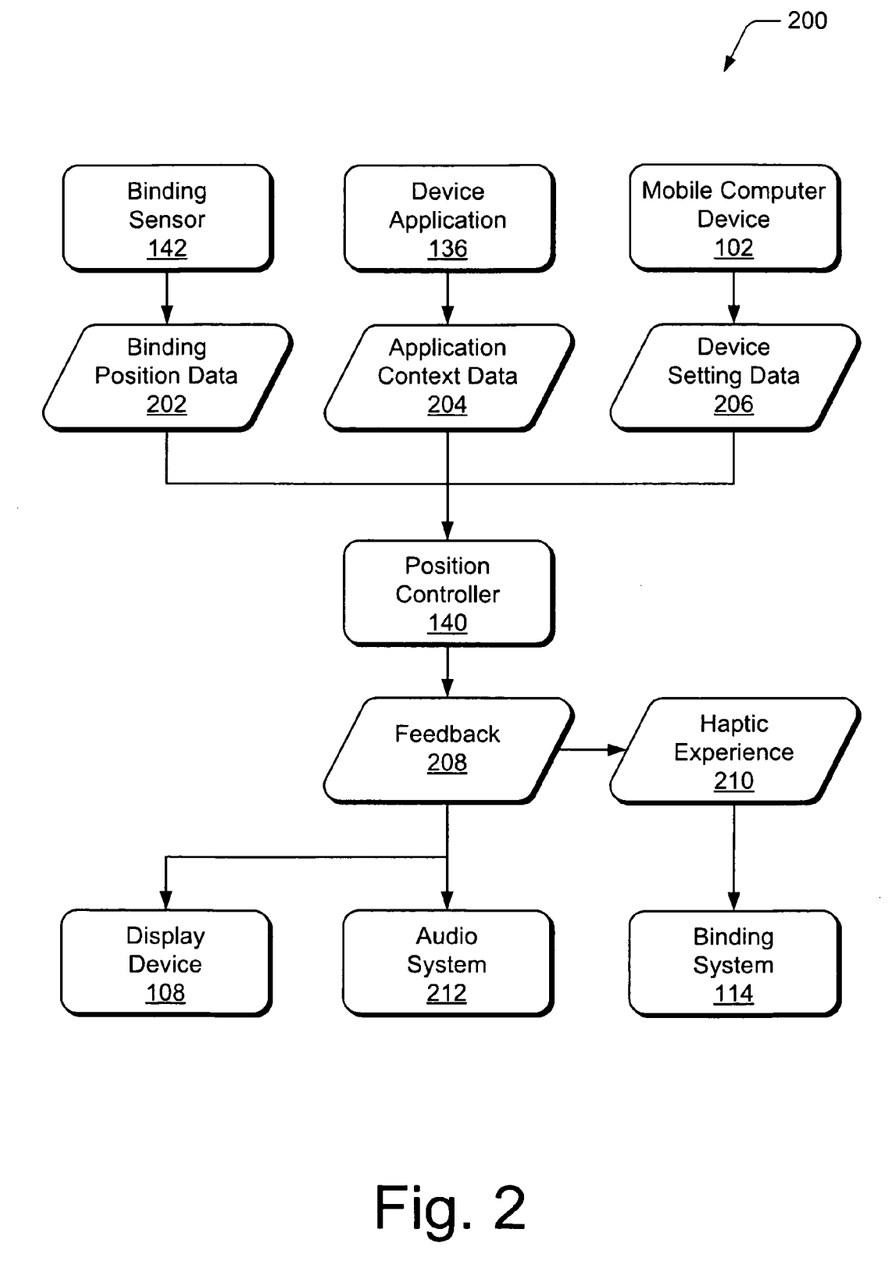
FIG. 2 further illustrates various components of the mobile computer device in accordance with one or more embodiments of mobile computer device binding feedback.

FIG. 2 further illustrates components of the mobile computer device 102 and a system 200 for binding feedback. In various embodiments, the position controller 140 is implemented to receive binding position data 202 from a binding sensor 142 that associated with the binding system 114, receive application context data 204 that is associated with a device application 136, and/or receive device setting data 206 that is associated with the mobile computer device 102. The position controller 140 can then initiate feedback 208 that correlates to the binding position data 202, the application context data 204, and/or to the device setting data 206. In various embodiments, the feedback 208 can be generated as audio feedback, video feedback, display feedback, and/or as haptic experience 210 that is generally indicative of any physical user feedback and/or touch-related feedback, such as vibration, changes in resistance to motion, and other movement resistance.

The binding position data 202 that is associated with the binding system 114 and received from a binding sensor 142 can include an indication of the angle between the first display 108 and the second display 112 of the mobile computer device 102 (e.g., or similarly, the angle between the first housing 106 and the second housing 110). The binding position data 202 can also be determined to correlate to a particular display posture of the mobile computer device 102. The feedback 208, such as haptic experience 210, can also be provided from other binding feedback mechanisms, such as a clutch or servo that controls rotatable movement of the binding system 114.

The application context data 204 that is associated with a device application 136 can include context data to enhance an application interface that is displayed on the first display 108 and/or the second display 112. For example, pages of an electronic book may be displayed on the first and second displays when the mobile computer device 102 is positioned in the book display posture 118. If the mobile computer device 102 is repositioned to the tablet display posture 130, a book reader application (e.g., a device application 136) can initiate the application context data 204 to continue displaying the pages of the electronic book even though the display posture of the device has changed.

The device setting data 206 that is associated with the mobile computer device 102 can include a user input to override display posture settings that correlate to the various display postures 100 of the mobile computer device 102. For example, the mobile computer device 102 may be set to a book mode in which case the first and second displays of the mobile computer device 102 display pages of the electronic book regardless of the display posture in which the mobile computer device is positioned.

The feedback 208 that is initiated by the position controller 140 can indicate a display posture in which to position the first display 108 and the second display 112. The feedback 208 can include audio feedback via an audio system 212 of the mobile computer device 102 and/or can include display feedback or video feedback for display on an integrated first display 108 of the mobile computer device 102. Alternatively or in addition, the feedback 208 can include locking the binding system 114 to hold the first housing 106 and the second housing 110 in a secure posture, such as with the two displays of the mobile computer device 102 closed together. The feedback 208 can also include stiffening the binding system 114 to hold the first housing 106 and the second housing 110 in a display posture for the first and second displays. The feedback 208 can also include simulating detents of the binding system 114 to indicate a display posture in which to position the first display 108 and the second display 112.

The feedback 208 (e.g., haptic experience 210) can actively provide feedback to a user of the mobile computer device 102, such as a feeling of detents when the angle between the first housing and the second housing of the device changes position. Alternatively or in addition, the binding system 114 may feel as if it moves easily until its near a contextual position that correlates to a particular display posture, and then feel affected by more gravity, tension, vibration, or stiffness at that position. For example, a book has a natural closing force and feel from the binding of the book, and the haptic experience 210 can correlate to the book display posture 118 of the mobile computer device 102 so that the binding system 114 feels like a book that is easier to close than open. In an embodiment, the haptic experience 210 changes output as the binding system changes the angle between the first housing 106 and the second housing 110 of the mobile computer device 102.

Example methods 300 and 400 are described with reference to respective FIGS. 3 and 4 in accordance with one or more embodiments of mobile computer device binding feedback. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. The example methods may be described in the general context of computer-executable instructions, which can include software, applications, routines, programs, objects, components, data structures, procedures, modules, functions, and the like.

The methods may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
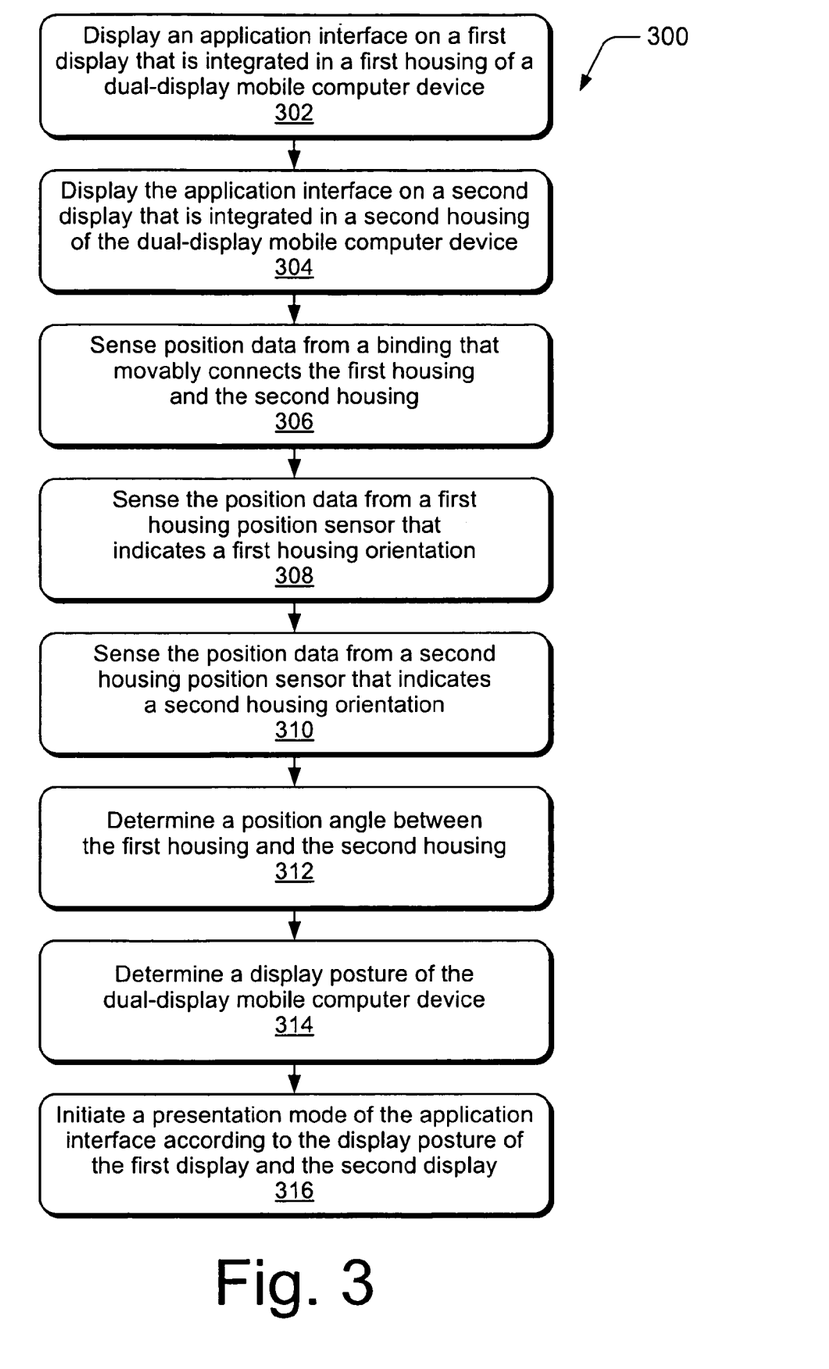
FIG. 3 illustrates example method(s) for mobile computer device display postures in accordance with one or more embodiments.

FIG. 3 illustrates example method(s) 300 of mobile computer device display postures. The order in which the method is described is not intended to be construed as a limitation, and any number of the described method blocks can be combined in any order to implement the method, or an alternate method.

At block 302, an application interface is displayed on a first display that is integrated in a first housing of a dual-display mobile computer device. For example, an application interface for a device application 136 is displayed on the first display 108 that is integrated in the first housing 106 of the mobile computer device 102. At block 304, the application interface is displayed on a second display that is integrated in a second housing of the dual-display mobile computer device. For example, the application interface for the device application 136 is displayed on the second display 112 that is integrated in the second housing 110 of the mobile computer device 102.

At block 306, position data is sensed from a binding that movably connects the first housing and the second housing. For example, a binding sensor 142 senses and generates position data of a binding system 114 that indicates a position angle between the first display 108 and the second display 112. At block 308, the position data is sensed from a first housing position sensor that indicates a first housing orientation and, at block 310, the position data is sensed from a second housing position sensor that indicates a second housing orientation. For example, a first housing position sensor 144 senses and generates the position data that indicates an orientation of the first housing 106. Similarly, a second housing position sensor 144 senses and generates the position data that indicates an orientation of the second housing 110. In embodiments, the position sensors 144 are implemented as the accelerometers 146 that are integrated into the housing 106 (i.e., and housing 110) of the mobile computer device 102.

At block 312, a position angle between the first housing and the second housing is determined. For example, the position controller 140 receives the position data and determines a position angle between the first display 108 and the second display 112 that correlates to a display posture of the mobile computer device 102.

At block 314, a display posture of the dual-display mobile computer device is determined. For example, the position controller 140 determines a display posture of the mobile computer device 102 from the position angle between the first display 108 and the second display 112. Alternatively and/or in addition, the position controller 140 determines the display posture of the mobile computer device 102 from an orientation of the first housing 106 and/or from an orientation and the second housing 110.

At block 316, a presentation mode of the application interface is initiated according to the display posture of the first display and the second display. For example, the position controller 140 initiates a presentation mode of an application interface on the first display 108 and on the second display 112 according to the determined display posture of the mobile computer device 102.

Figure 4:
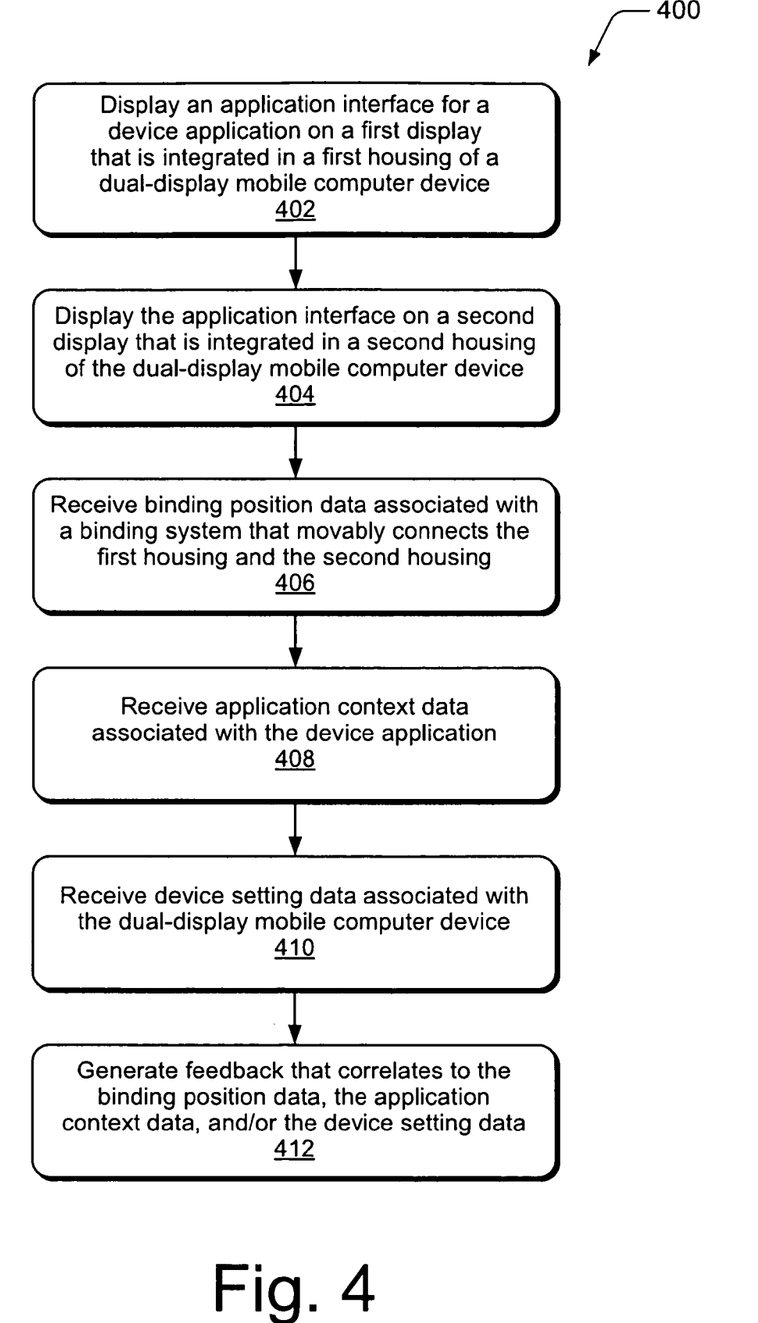
FIG. 4 illustrates example method(s) for mobile computer device binding feedback in accordance with one or more embodiments.

FIG. 4 illustrates example method(s) 400 of mobile computer device binding feedback. The order in which the method is described is not intended to be construed as a limitation, and any number of the described method blocks can be combined in any order to implement the method, or an alternate method.

At block 402, an application interface for a device application is displayed on a first display that is integrated in a first housing of the dual-display mobile computer device. For example, an application interface for a device application 136 is displayed on the first display 108 that is integrated in the first housing 106 of the mobile computer device 102. At block 404, the application interface is displayed on a second display that is integrated in a second housing of the dual-display mobile computer device. For example, the application interface for the device application 136 is displayed on the second display 112 that is integrated in the second housing 110 of the mobile computer device 102.

At block 406, binding position data associated with a binding system that movably connects the first housing and the second housing is received. For example, the position controller 140 receives binding position data 202 from a binding sensor 142 that associated with the binding system 114. At block 408, application context data associated with the device application is received. For example, the position controller 140 receives application context data 204 that is associated with a device application 136. At block 410, device setting data associated with the dual-display mobile computer device is received. For example, the position controller 140 receives device setting data 206 that is associated with the mobile computer device 102.

At block 412, feedback is generated that correlates to the binding position data, the application context data, and/or the device setting data. For example, the position controller 140 generates feedback 208 that correlates to the binding position data 202, the application context data 204, and/or to the device setting data 206. In various embodiments, the feedback 208 can be generated as audio feedback, video feedback, display feedback, and/or as haptic experience 210 that is generally indicative of any physical user feedback and/or touch-related feedback, such as vibration, other vibratory feedback, changes in resistance to motion, motion or movement resistance, physical impulse (clicks, or physical or simulated detents), and the like. The feedback 208 can also indicate a display posture in which to position the first display and the second display, and the display posture correlates to the position of the first and second displays to display an application interface according to the application context data. The generated feedback 208 can include locking the binding system to hold the first housing and the second housing in a secure posture; stiffening the binding system to hold the first housing and the second housing in a display posture; and/or simulating detents of the binding system to indicate a display posture in which to position the first display and the second display.

Figure 5:
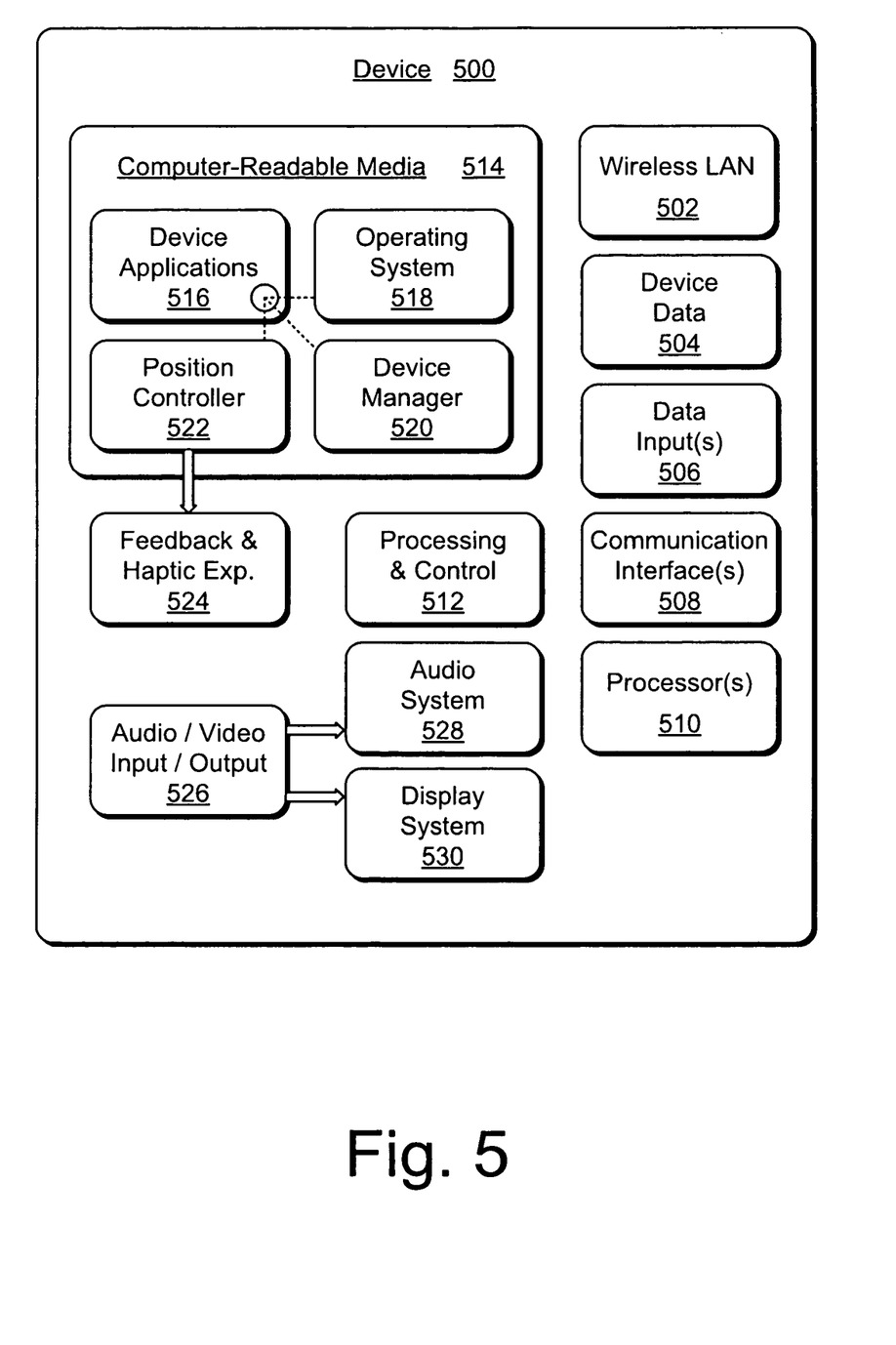
FIG. 5 illustrates various components of an example device that can implement embodiments of mobile computer device binding feedback.

FIG. 5 illustrates various components of an example device 500 that can be implemented as any type of mobile computing and/or communication device, a portable device, electronic device, appliance device, media device, consumer device, gaming device, and/or the mobile computer device as described with reference to FIG. 1 to implement embodiments of mobile computer device binding feedback. Device 500 may also be associated with a user (i.e., a person) and/or an entity that operates the device such that a device describes logical devices that include users, software, firmware, and/or a combination of devices.

If implemented as a wireless device, the device 500 can include wireless LAN (WLAN) components 502 that enable wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image media content. Device 500 can also include one or more data inputs 506 via which any type of data, media content, and/or inputs can be received, such as music, television media content, recorded video content, and any other type of audio, video, and/or image content received from a content source which can then be processed, rendered, and/or displayed for viewing.

Device 500 can also include communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices can communicate data with device 500.

Device 500 can include one or more processors 510 (e.g., any of microprocessors, controllers, control circuits, and the like) which process various computer-executable instructions to control the operation of device 500. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 can also include computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 514 provides data storage mechanisms to store the device data 504, as well as various device applications 516 and any other types of information and/or data related to operational aspects of device 500. For example, an operating system 518 can be maintained as a computer application with the computer-readable media 514 and executed on processors 510. The device applications 516 can include a device manager 520 (e.g., a control application, software application, signal processing and control module, code that is native to a particular device, a hardware abstraction layer for a particular device, etc.). The device applications 516 can also include a position controller 522 to implement embodiments of mobile computer device binding feedback, and to generate feedback and/or a haptic experience output 524. In this example, the device applications 516 are shown as software modules and/or computer applications.

Device 500 can also include an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, audio system 528 and/or the display system 530 can be implemented as external components to device 500. Alternatively, the audio system 528 and/or the display system 530 can be implemented as integrated components of example device 500.

Although embodiments of mobile computer device binding feedback have been described in language specific to features and/or methods, it is to be understood that the subject of the appended claims is not necessarily limited to the specific features or methods described. Rather, the specific features and methods are disclosed as example implementations of mobile computer device binding feedback.

The invention claimed is:

1. A dual-display mobile computer device, comprising:
   a first housing that includes a first display configured to display an application interface when generated for a device application;
   a second housing that includes a second display configured to display the application interface, the second housing movably connected to the first housing with a binding system;
   a position controller configured to:
   receive binding position data associated with the binding system;
   receive application context data associated with the device application; and
   initiate feedback that correlates to the binding position data and the application context data.

2. A dual-display mobile computer device as recited in claim 1, wherein the feedback includes at least one of audio feedback, video feedback, display feedback, or haptic feedback.

3. A dual-display mobile computer device as recited in claim 1, wherein the position controller is further configured to receive device setting data, and initiate the feedback that correlates to the device setting data.

4. A dual-display mobile computer device as recited in claim 1, wherein the feedback includes locking the binding system to hold the first housing and the second housing in a secure posture.

5. A dual-display mobile computer device as recited in claim 1, wherein the feedback includes stiffening the binding system to hold the first housing and the second housing in a display posture.

6. A dual-display mobile computer device as recited in claim 1, wherein the feedback includes vibration of the binding system to indicate movement of at least one of the first housing or the second housing approaching a display posture.

7. A dual-display mobile computer device as recited in claim 1, wherein the feedback indicates a display posture in which to position the first display and the second display, and wherein the application interface is displayed according to the application context data.

8. A dual-display mobile computer device as recited in claim 7, wherein the feedback indicates a laptop display posture when the application context data correlates to a landscape display mode of the application interface, and when the binding position data correlates to an angle between the first display and the second display that is less than one-hundred and eighty degrees (180°).

9. A dual-display mobile computer device as recited in claim 7, wherein the feedback indicates a book display posture when the application context data correlates to a portrait display mode of the application interface, and when the binding position data correlates to an angle between the first display and the second display that is less than one-hundred and eighty degrees (180°).

10. A dual-display mobile computer device as recited in claim 7, wherein the feedback indicates a presentation display posture when the application interface is displayed in approximate opposing directions on the first display and on the second display, and when the binding position data correlates to an angle between the first display and the second display that is greater than one-hundred and eighty degrees (180°) and less than three-hundred and sixty degrees (360°).

11. A dual-display mobile computer device as recited in claim 7, wherein the feedback indicates a surface display posture when the binding position data correlates to an angle between the first display and the second display that is approximately one-hundred and eighty degrees)(180°).

12. A dual-display mobile computer device as recited in claim 7, wherein the feedback indicates a tablet display posture when the binding position data correlates to an angle between the first display and the second display that is approximately three-hundred and sixty degrees (360°).

13. A mobile computer device, comprising:
a first display device configured to display a graphical interface;
at least a second display device configured to display at least one of the graphical interface or an additional graphical interface;
a binding system configured to movably connect the first display device and the at least second display device; and
a position controller configured to generate feedback based on a context of the graphical interface and a position of the first display with reference to the at least second display.

14. A mobile computer device as recited in claim 13, wherein the position controller is further configured to generate the feedback as at least one of audio feedback, video feedback, display feedback, or haptic feedback.

15. A mobile computer device as recited in claim 13, wherein the position controller is further configured to generate the feedback based on device setting data of the mobile computer device.

16. A mobile computer device as recited in claim 13, wherein the position controller is further configured to lock the binding system as the generated feedback to hold the first display and the second display in a secure posture.

17. A mobile computer device as recited in claim 13, wherein the position controller is further configured to stiffen the binding system as the generated feedback to hold the first display and the second display in a display posture.

18. A mobile computer device as recited in claim 13, wherein the position controller is further configured to simulate detents of the binding system as the generated feedback to indicate a display posture in which to position the first display and the second display, the detents simulated as at least one of physical impulses or aural clicks of the binding system to indicate acquisition during movement of a display posture.

19. A mobile computer device as recited in claim 13, wherein the position controller is further configured to indicate a display posture in which to position the first display and the second display.

20. A mobile computer device as recited in claim 13, wherein the display posture correlates to the position of the first display and the second display to display the graphical interface according to the context of the graphical interface.

* * * * *